(12) United States Patent
Ha

(10) Patent No.: US 7,505,693 B1
(45) Date of Patent: Mar. 17, 2009

(54) MINIATURE WAVEFORM MODULATOR WITH FULL PULSE BY PULSE TIMING CONTROL

(75) Inventor: Phong V. Ha, Chino Hills, CA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 577 days.

(21) Appl. No.: 11/324,423

(22) Filed: Jan. 3, 2006

Related U.S. Application Data

(60) Provisional application No. 60/640,466, filed on Dec. 31, 2004.

(51) Int. Cl.
*H04B 10/04* (2006.01)

(52) U.S. Cl. ............... 398/189; 398/190; 398/191; 398/182; 398/183; 342/14; 359/298; 359/299; 372/38.02

(58) Field of Classification Search ............ 398/182, 398/189, 190, 191, 183; 342/14; 359/298, 359/299; 372/38.02
See application file for complete search history.

(56) References Cited

U.S. PATENT DOCUMENTS

| | | | |
|---|---|---|---|
| 5,012,808 A | 5/1991 | Stubbers et al. | |
| 5,078,134 A | 1/1992 | Heilman et al. | |
| 6,304,839 B1 | 10/2001 | Ho et al. | |
| 6,429,446 B1 * | 8/2002 | Labaugh | 250/504 R |
| 6,494,370 B1 | 12/2002 | Sanchez | |
| 6,629,638 B1 | 10/2003 | Sanchez | |
| 6,662,052 B1 | 12/2003 | Sarwal et al. | |
| 7,123,843 B2 * | 10/2006 | Melick et al. | 398/189 |
| 2003/0161280 A1 * | 8/2003 | Gruhn et al. | 370/328 |
| 2003/0205126 A1 * | 11/2003 | O'Neill | 89/1.11 |
| 2005/0206551 A1 * | 9/2005 | Komiak et al. | 342/42 |

* cited by examiner

*Primary Examiner*—Kenneth N Vanderpuye
*Assistant Examiner*—Li Liu
(74) *Attorney, Agent, or Firm*—Daniel J. Long; Robert K. Tendler

(57) ABSTRACT

A miniature waveform modulator is provided to modulate an infrared laser. The miniature waveform modulator outputs a pulse train having different and specified pulse widths, with the pulse train used to modulate the laser. In one embodiment, the pulse train extends over a significant period of time without resorting to generating short pulse trains and combining them. The subject architecture permits the miniature waveform modulator to be compact and implementable on an electronic circuit card. It is significant that the pulse train is generated without software intervention by automatically copying a timing table to a buffer that is automatically read out to a pulse generator. If the buffer size is smaller than that required by the timing table, slices or segments of the timing table are sequentially read out or copied to the buffer, with the next timing table segment transferred to the buffer upon read out of a prior segment. Since there is no or little software intervention, the waveform modulator can be miniaturized and can provide full pulse-by-pulse timing control to accommodate high pulse repetition rates.

5 Claims, 4 Drawing Sheets

MINIATURE WAVEFORM MODULATOR WITH FULL PULSE BY PULSE TIMING CONTROL

CROSS REFERENCE TO RELATED APPLICATION

This application claims under priority 35 USC §119(e) from U.S. Application Ser. No. 60/640,466 filed Dec. 31, 2004, the contents of which are incorporated herein by reference.

FIELD OF THE INVENTION

This invention relates to the generation of variable width pulse trains having a precise predetermined waveform, and more particularly to producing extended length variable pulse width waveforms.

BACKGROUND OF THE INVENTION

It will be appreciated that in electronic warfare, and more particularly for infrared missile countermeasures, pulsed waveforms are employed that are used to illuminate a missile seeker to countermeasure the incoming missile. This is accomplished by injecting the waveforms into the seeker that will confuse the seeker or cause it to guide the missile wave from its intended target.

There is therefore a need to be able to produce a pulsed waveform with predetermined variable pulse widths and to do so over the entire engagement that can be as long as twenty seconds. Note the pulse widths must be controlled to vary pulse by pulse so that different pulse widths are generated for the entire engagement period without having to replicate the same train pulse over and over. In order to produce laser outputs, a modulation system is to be used to modulate infrared lasers employed in InfraRed CounterMeasure systems, IRCMs, or Directional InfraRed CounterMeasure systems, DIRCMs.

The infrared laser in these systems must be modulated so that it produces a pulsed output having the desired waveform. For instance, the desired waveform may include long pulses, with short inter pulse spacing; or shortened pulses with long inter pulse spacing; or indeed any combination thereof.

The problem is how to generate the desired pulsed waveforms over ten to twenty seconds; and to do so without significant software intervention or large amounts of rack space in the equipment bay of an aircraft.

In the past, modulators are typically set to generate a relatively short waveform, for instance over 100 milliseconds, and then simply repeat the sequence until the twenty second engagement interval has been completed. However, this type of waveform replication does not effectively countermeasure seekers because the seeker's response can vary over time, requiring different waveforms. There is therefore a need to be able to provide a pulse train that has a pulse width variable waveform that extends over the entire engagement interval and varies to eliminate the effect of varying seeker parameters, be they environmental or intentional.

One brute force approach to the generation of pulsed waveforms is to divide up the waveform into segments or slices and generate the pulse-on pulse-off times for the pulses in each segment or slice utilizing a separate pulse generator. The slices are then chained together to form the desired elongated pulse train. However, it will be appreciated that if one needed a separate piece of equipment for every 100 millisecond time segment, producing twenty seconds worth of waveforms would be prohibitively expensive, not only in terms of cost, but also in terms of rack space.

There is therefore a necessity to provide a miniature waveform modulator that can modulate an infrared laser so as to produce a completely characterized and controllable waveform that has precise pulse widths over an extended period of time, without the use of replication.

In short, there is necessity for a miniature waveform modulator that performs full pulse-by-pulse timing control which not only is capable of characterizing the entire pulse train over twenty seconds but is also capable of high pulse repetition rates in which a narrower variable width pulses can be generated, for instance pulse widths of 500 microseconds, or less.

While one could conceivably produce the desired pulse train utilizing software, the software overhead oftentimes exceeds the inter pulse spacing, thus preventing high repetition rate pulse generation. This is because one could not pulse-on and pulse-off fast enough due to the software overhead.

Moreover, there is a requirement to package a fully programmable and controllable waveform generator in a small compact electronic card so as to occupy virtually no rack space in the equipment bay of an aircraft. One also needs the ability to package a complete laser or lamp sub-system into a single and compact unit by significantly reducing the size of the control electronics. Most important is the capability to precisely control all individual time periods in the entire waveform and to do so over extended periods of time such that the pulses in the pulsed waveform can be provided with different pulse widths over the entire multi-second engagement period.

SUMMARY OF INVENTION

In the subject invention, a miniature waveform modulator is provided that generates a waveform having pulse widths specified by a timing table. This permits the generation of a pulse train with pulses of differing widths and differing inter-pulse spacing, with the length of the pulse train only limited by the size of the timing table.

In one embodiment, the timing table is segmented with segments serially copied out without software involvement to specify the pulse widths for all pulses in the pulse chain. This copy operation is performed using a hardware move operation which takes little or no instruction cycles. The result is an extended pulse chain that is made as long as desired, and especially long enough to encompass an engagement period.

In one embodiment, the waveform generator includes two critical components, a hardware component and software component. The hardware component includes a pulse generator that generates pulses under the control of the timing table which is automatically read out to the pulse generator without software involvement. In this embodiment, the timing table, which specifies the pulse widths of each of the individual pulses in the extended pulse train, is copied to a transfer table buffer area in segments, with each segment containing the pulse-on and pulse-off times for the pulses. The transfer table buffer area is automatically outputted to the pulse generator whenever an elapsed timer matches with the desired pulse delay. This also decrements an edge counter used to keep track of when the segment has been downloaded. Note that the use of this type of hardware update allows for short pulses to be generated in order to support high pulse repetition rates, and involves no software intervention.

When the transfer table buffer has been completely read out, a next data load is copied from the timing table buffer area to the transfer table buffer area so that the transfer table buffer area contains the next segment of the timing table.

This operation requires an insignificant amount of software to simply copy a segment of the timing table buffer area to the transfer table buffer area. The process then continues until the end of the timing table, with the timing table specifying the different pulse widths of the pulses in the pulse train from start to finish during the engagement period.

Note, by avoiding software involvement, one can specify pulse widths for ultra short pulses due to the absence of software intervention and attendant overhead.

More particularly, the subject miniature waveform modulator has as a hardware component, in one embodiment, an electronic circuit card that contains a small and powerful microcontroller or equivalent part. Programmable logic gates such as field programmable gate arrays, FPGAs, or equivalent circuits may be utilized in the electronic component.

In one embodiment, the electronic component and the software component are implementable in a single small integrated circuit involving a microcontroller, a RAM/Flash RAM, a UART, and an address and data bus. The timing table is set up in the microcontroller through the UART so that the waveform can be externally specified. Thus, the UART is for external control and reprogram capability, with the hardware components tied together on a common address and data bus. Note that RS-422 drivers can be utilized to drive external sources that receive the waveform, with RAM and Flash RAM being used to increase microcontroller memory.

As mentioned above, the software component involves the timing table that is used to prepare and load timing data for specifying pulse widths. The software architecture design is such that a single table holds all transition timing values, namely the on and off times for the pulses. Note that without replicating pulse segments to fill up a multi-second engagement period one must nonetheless provide a wave train that covers the entire engagement period.

To do this, the timing table is divided into manageable "slices" that are copied into the buffer area where data from this area is used in the automatic data transfer. It will be appreciated that the subdivision of the timing table into slices may be required if the automatic data transfer buffer area is smaller than that required by the timing data table.

In summary, a miniature waveform modulator is provided to modulate an infrared laser. The miniature waveform modulator outputs a pulse train having different and specified pulse widths, with the pulse train used to modulate the laser. In one embodiment, the pulse train extends over a significant period of time without resorting to generating short pulse trains and combining them. The subject architecture permits the miniature waveform modulator to be compact and implementable on an electronic circuit card. It is significant that the pulse train is generated without software intervention by automatically copying a timing table to a buffer that is automatically read out to a pulse generator. If the buffer size is smaller than that required by the timing table, slices or segments of the timing table are sequentially read out or copied to the buffer, with the next timing table segment transferred to the buffer upon read out of a prior segment. Since there is no software intervention, the waveform modulator can be miniaturized and can provide full pulse-by-pulse timing control to accommodate high pulse repetition rates.

BRIEF DESCRIPTION OF THE DRAWINGS

These and other features of the subject invention will be better understood in connection with the Detailed Description, in conjunction with the Drawings, of which.

DETAILED DESCRIPTION

Figure 1:
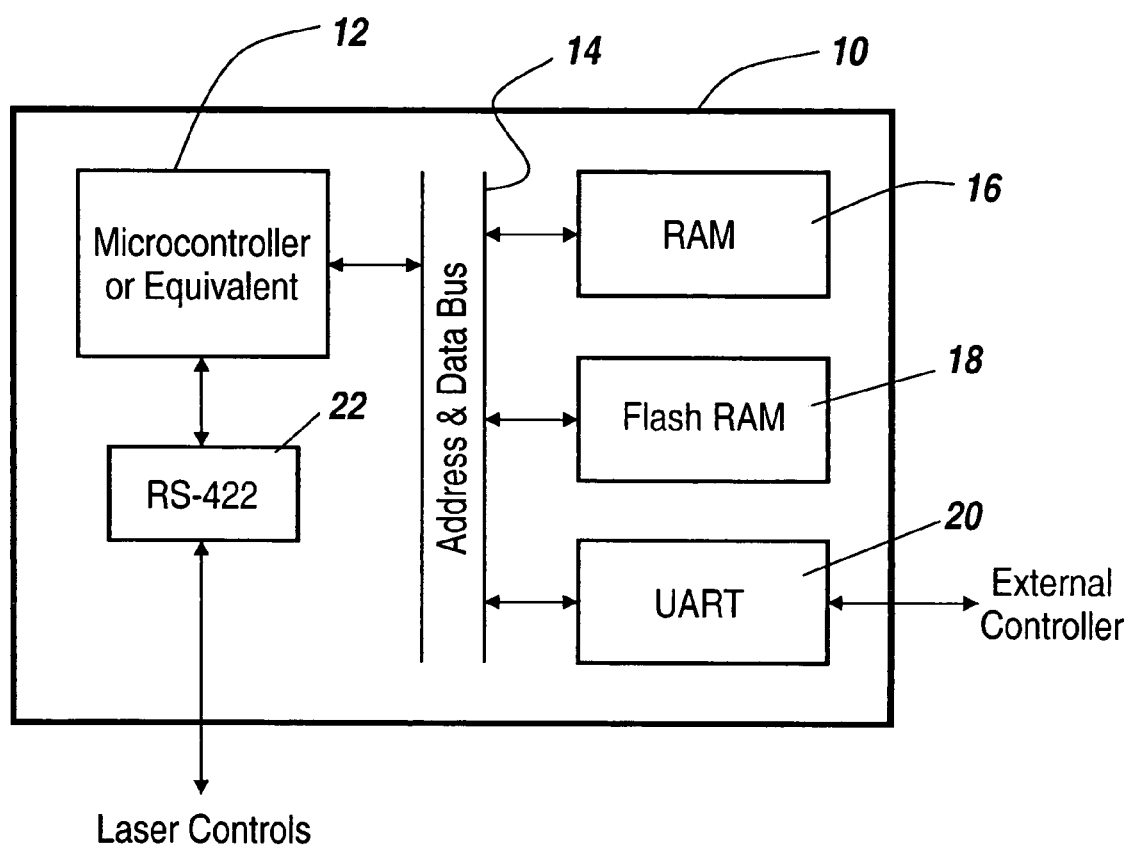
FIG. 1 is a block diagram of the electronic component of the subject invention showing a microcontroller and additional memory, with the microcontroller being programmable from an external controller and with laser controls being provided through the use of RS-422 drivers.

Referring now to FIG. 1, the electronic component 10 for the subject invention contains a micro-controller, or microprocessor, with internal hardware resources such as timers and counters required to perform the pulse waveform generation. The micro-controller would have embedded components, such as registers, to perform standard processing. Moreover, a micro-controller is included that has the ability to react to an event, such as the elapse of a specific time duration, and to automatically move byte/word data from a particular location into another location without software intervention. Moreover, the microprocessor has the ability to automatically increment the data pointer in preparation for copying of the next timing table segment to the buffer. Additionally, the microprocessor has the ability to automatically toggle an output associated with a running timer. The automatic data transfer, pointer update, and output toggle capabilities allow for high frequency waveforms to be generated since software overheads are eliminated during the automated data transfer. These automatic capabilities are performed by software initialization of the micro-controller's event register and timer compare register prior to any waveform generation.

The micro-controller, or equivalent 12, of electronic component 10 connects to an address and data bus 14, in turn coupled to a RAM 16 and a Flash RAM 18 and a UART 20. In terms of the read out of the micro-controller, RS-422 drivers 22 provide laser modulation control signals.

The UART is for external control or programming capability, with the hardware components tied together using a common address and data bus.

Note that electronic component 10 can be a Programmable Logic Gate Array that has similar functions to those described above.

Figure 2:
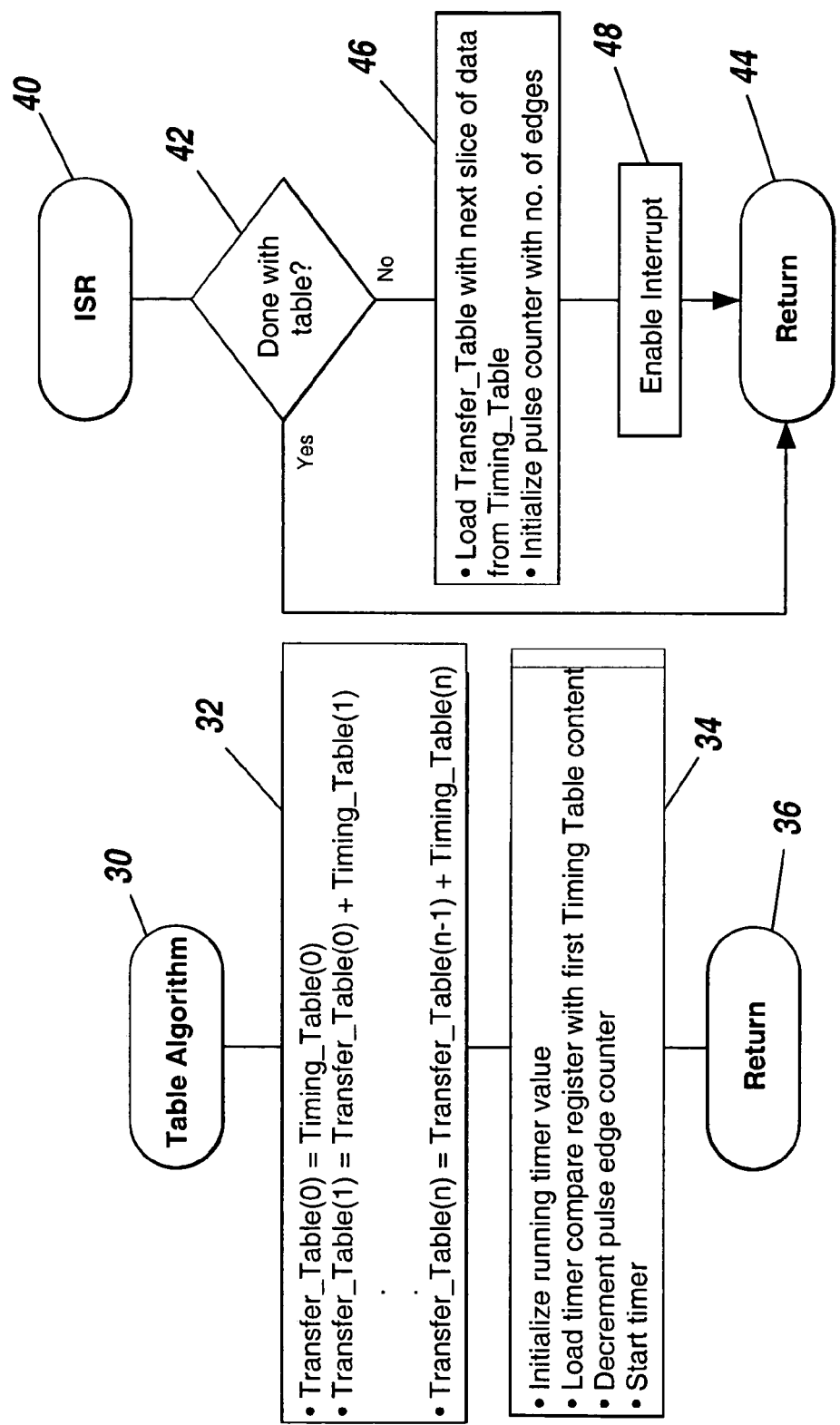
FIG. 2 is a flow chart showing the software component in terms of populating a timing table with the on and off times for each of the pulses that are to be generated, with the software initializing a running timer value, loading the timer with a timing table content, decrementing a pulse edge counter and starting the timer, with an interrupt service request function shown for the preparation of the transfer table for the next set of timing data.

Referring to FIG. 2, a flow chart is shown for the software component of the subject system in which a Table Algorithm 30 sets up a transfer table 32, which specifies for each pulse the duration of the pulse and the inter-pulse time period between one pulse and the next for one segment.

The timing table as shown at 34 is utilized for initializing a running timer value, loading a timer compare register with first timing table content, decrementing a pulse edge counter and starting the timer. After these functions have been accomplished as illustrated at 36, one returns to the beginning of the Table Algorithm.

The electronic component handles the automatic transfer of the next timer value into the timer compare register, i.e., the transfer of the next timing period within the segment to the buffer after time has elapsed for that particular pulse time period. Thereafter the pulse edge counter is decremented.

No software intervention occurs until the last slice time value has been loaded. Interrupt services are utilized to notify the software that the load of the last time value for the slice has occurred, such that software can prepare to copy the next set of time values for the next timing table segment.

In order to perform this, an interrupt service request, ISR 40 is initiated which invokes a decision block 42 to decide whether the last table segment has been copied. If so, the system does not set up the waveform generator and the program is returned as illustrated at 44.

If not, as illustrated at 46, the algorithm loads pulse-on, pulse-off time values from the timing table relating to the next slice or segment of the table to the transfer table and then initializes a pulse counter with the number of edges associated with the pulses in this next slice or segment. Thereafter, an interrupt is enabled, as illustrated at 48.

The interrupt service request function shows the preparation of the transfer table for the next slice or segment of timing data.

Figure 3:
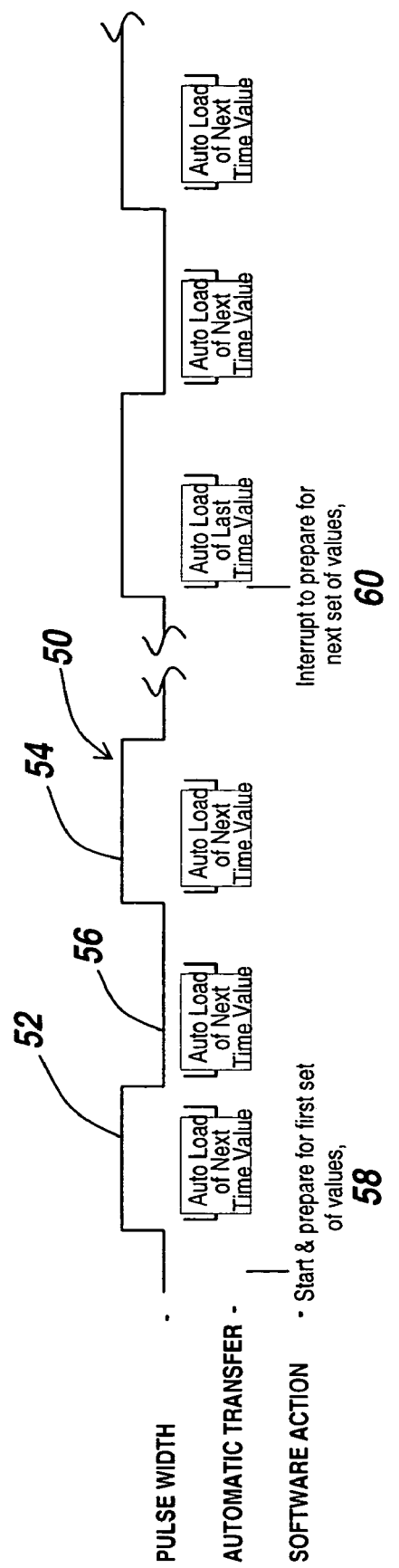
FIG. 3 is a waveform illustrating the variable pulse widths to be generated, illustrating the auto load function and software action including start and prepare functions for the first set of values, as well as an interrupt for the next set of values; and, FIG. 4 is block diagram showing the waveform generation process involving a timing table buffer area, a transfer table buffer area, a pulse generator and the copying of a section of the timing table buffer area to the transfer table buffer area, followed by copying of the next section of the timing table buffer area to the transfer table buffer area after the transfer table buffer area has been used to control the pulse generator.

Referring now to FIG. 3, waveform generation is shown in which a waveform 50 has pulses of different pulse widths 52 and 54, along with variable inter-pulse spacings 56. In this figure, it can be seen an automatic transfer occurs during the auto load of the next time value. As can be seen, the software action takes place during the start and preparation for the copying of the first set of values for a first segment as illustrated at 58 which is again invoked after interrupt as illustrated at 60 to prepare for the next segment set of values to be loaded.

Due to the segmenting of the timing table, it is necessary to copy the next segment of the timing table to the transfer table buffer after time periods in the buffer contents relating to a prior segment have been generated, whereupon the pulse train that is generated is used to modulate the laser. As a result of the sequential dumping of the pulse-on pulse-off values a continuous set of pulses is generated to modulate the laser that can stretch from five seconds to twenty seconds so as to correspond to any required engagement period. Note that the waveform duration is directly dependent on the available memory in the electronic component and on how many time values there are in the waveform. Thus the subject system can generate pulse trains of more than 20 seconds in length.

Figure 4:
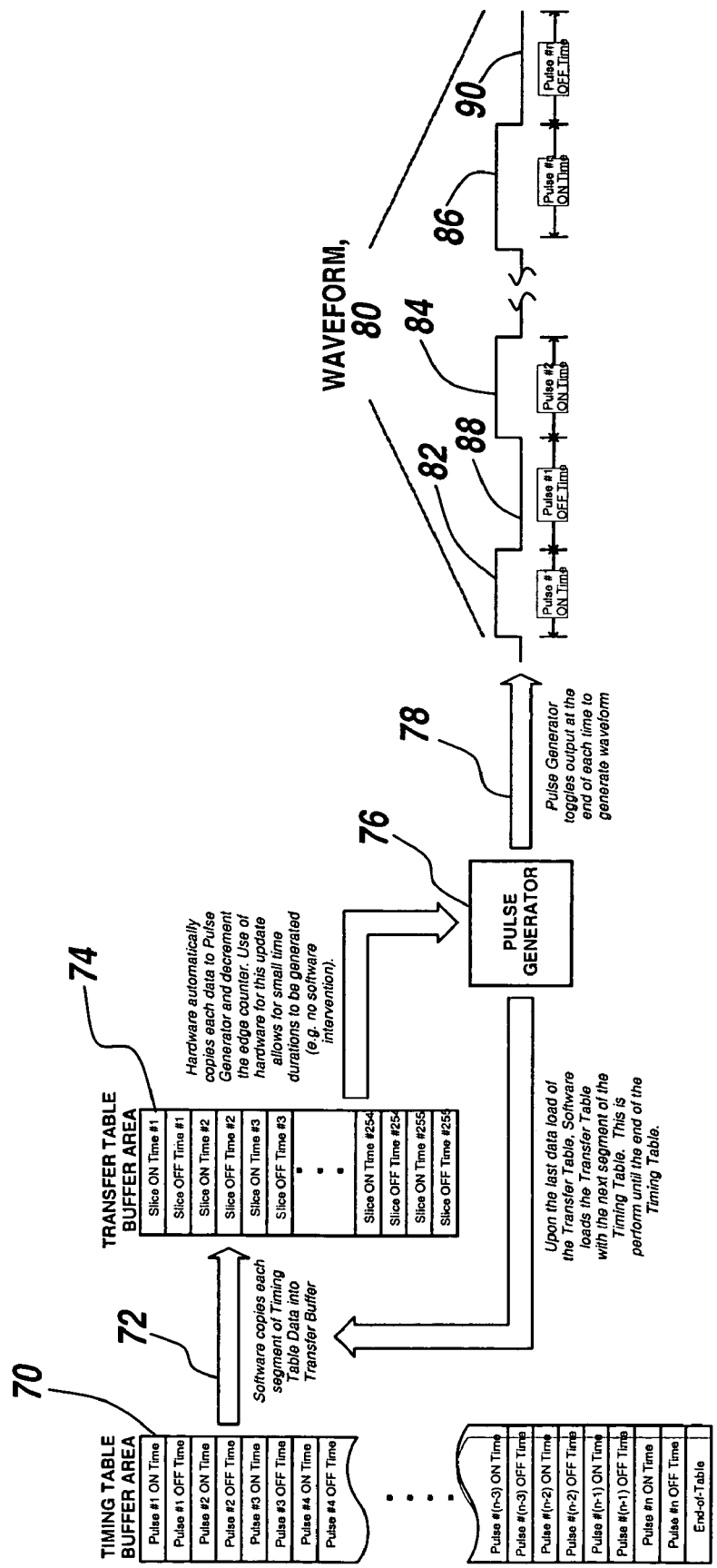

More particularly, and referring to FIG. 4, the waveform generation process is summarized as follows: a timing table buffer area 70 contains the pulse-on, pulse-off values that are copied as illustrated by arrow 72 to a transfer table buffer area 74. Read out of the buffer in turn results in an output that is coupled to a pulse generator 76. Pulse generator 76 toggles its outputs, as illustrated at 78 to generate waveform 80.

Note that timing table buffer area 70 specifies the on-time for the first pulse and off-time for the first pulse, followed by the on-time for the second pulse and the off-time for the second pulse; and continues through to the last pulse which corresponds to the end of the last segment or slice of data. The timing table data is automatically copied into the transfer buffer, with the hardware automatically generating each pulse width and spacing. The hardware then automatically decrements the edge counter to keep track of when all the pulse widths in a segment have been processed. It is noted that the use of the hardware for this update is what allows for high pulse repetition rates due to the fact that the pulse width specification is generated without software intervention.

Upon the downloading of the last data load of a segment to the pulse generator, the software component loads the buffer with the next segment of timing table data. This sequencing through of the segments of the timing table occurs until the end of the timing table, corresponding in one embodiment to the end of the engagement period.

In short, the pulse generator generates pulses 82, 84, and 86, each with specified pulse-on times, with the pulse generator also turning off pulse generation for inter-pulse spacings corresponding to the off-times specified by the timing table. Here the off-time segments are shown at 88 and 90.

In summary, what is provided is a system and method of creating a miniature waveform generator with full control of each individual pulse width and each inter-pulse spacing. The result is a pulse train of pulses that can be made to extend over a significant period of time, in one embodiment over an entire engagement period, all with little software intervention. The subject system utilizes inexpensive commercial off-the-shelf electronics and special software algorithms to provide this capability so that for the majority of the waveform generation hardware automatically copies the data, moves the data, and provides for the generation of the pulses, with the software component only coming into play to load the next set of time values of the timing table. An interrupt is provided to permit the software to be executed to load the next segment or section of the timing table so that a multi-second pulse train can be generated by the copying out of the sequential segments of the timing table.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. Apparatus for generating an elongated pulse train with specified pulse lengths and inter-pulse spacings, comprising:
   a waveform modulator including a timing table containing the specified pulse lengths and inter-pulse spacings;
   a buffer operatively coupled to said timing table for automatically and sequentially outputting the start times and stop times of said pulses; said buffer being smaller in size than that required to buffer said timing table, said timing table being divided up into segments;
   a pulse generator coupled to said buffer for generating a pulse train having pulses with corresponding pulse-on and pulse-off times such that said pulse train is generated automatically, whereby the length of said pulse train is determined by the number of pulses specified in said timing table,
   means for sequentially reading out said timing table segments to said buffer after a prior segment has been read out to said pulse generator;
   a laser and laser modulator therefor; and,
   means for coupling the output of said pulse generator to said laser modulator, whereby said waveform modulator is operative to cause said laser to produce laser pulses corresponding to the pulse train generated by said pulse generator, said laser being utilized to countermeasure a missile having a seeker over an engagement period, and wherein the length of said pulse train is at least as long as said engagement period, whereby pulse repetition is avoided in the generating of laser pulses spanning said engagement period.

2. The apparatus of claim 1, wherein said engagement period is a multi-second engagement period.

3. The apparatus of claim 2, wherein said multi-second engagement period exceeds five seconds.

4. The apparatus of claim 1, wherein said waveform modulator is a miniature waveform modulator, including circuits, said waveform modulator including an electronic circuit card with said waveform modulator circuits thereon.

5. A method for generating a high pulse repetition rate variable pulse width pulse train having a characteristic designed when used to modulate a laser to countermeasure an incoming missile by producing corresponding laser pulses lasting at least as long as the engagement period associated with countermeasuring the missile, comprising the steps of:

generating the variable pulse width pulse train using a timing table that specifies the starting and stopping times of the pulses, with the timing table containing the characteristic pulse widths and inter-pulse spacing effective when modulating the laser to countermeasure the missile;

copying the timing table values to a buffer;

reading out the buffer to a pulse generator that takes the buffer data and produces a pulse train; and, modulating the laser with the pulse train, whereby a precise pulse train is generated without software overhead that would preclude generation of high pulse repetition rate laser pulses, the steps of copying the timing table to the buffer and reading out the buffer to the pulse generator being accomplished through automatic operation of hardware involving no software intervention, whereby the pulse repetition associated with pulse train is limited only by hardware processing speeds, thus to permit generation of the high pulse repetition rate laser output pulses, data in the timing table being segmented to permit small buffer sizes, and, further including the steps of initially copying a first timing table segment to the buffer and subsequently copying a succeeding timing table segment to the buffer after the buffer has read out the initial segment to the pulse generator, whereby the majority of the software involved is that associated with initiating copying of subsequent timing table segments to the buffer.

* * * * *